US008899034B2

(12) United States Patent
Ballweg et al.

(10) Patent No.: US 8,899,034 B2
(45) Date of Patent: Dec. 2, 2014

(54) HYDRAULIC SYSTEM WITH FLUID FLOW SUMMATION CONTROL OF A VARIABLE DISPLACEMENT PUMP AND PRIORITY ALLOCATION OF FLUID FLOW

(75) Inventors: Jacob Ballweg, Waukesha, WI (US); Gary J. Pieper, Eagle, WI (US); Corey K. Quinnell, West Allis, WI (US); Jonathan M. Starkey, Bowdon (GB); Eric P. Hamkins, Waukesha, WI (US)

(73) Assignee: HUSCO International, Inc., Waukesha, WI (US)

(*) Notice: Subject to any disclaimer, the term of this patent is extended or adjusted under 35 U.S.C. 154(b) by 525 days.

(21) Appl. No.: 13/334,153

(22) Filed: Dec. 22, 2011

(65) Prior Publication Data

US 2013/0160443 A1 Jun. 27, 2013

(51) Int. Cl.
*F16D 31/02* (2006.01)

(52) U.S. Cl.
USPC .............................................. 60/424; 60/484

(58) Field of Classification Search
CPC .... F15B 11/162; F15B 11/163; F15B 11/165; F15B 11/042; F15B 11/0423
USPC .............................. 60/422, 452, 445; 91/513
See application file for complete search history.

(56) References Cited

U.S. PATENT DOCUMENTS 3,970,108 A 7/1976 Ailshie
4,383,412 A * 5/1983 Presley .......................... 60/430
4,470,260 A 9/1984 Miller et al.
4,573,319 A 3/1986 Chichester
4,665,698 A 5/1987 Trusock
5,277,027 A * 1/1994 Aoyagi et al. .................. 60/420
5,319,933 A 6/1994 Omberg et al.
5,333,449 A * 8/1994 Takahashi et al. .............. 60/427
5,413,452 A 5/1995 Lech et al.
5,579,642 A 12/1996 Wilke et al.
5,615,553 A 4/1997 Lourigan
5,896,943 A 4/1999 Christensen
5,937,645 A 8/1999 Hamamoto
5,950,429 A * 9/1999 Hamkins ......................... 60/422
6,018,895 A 2/2000 Duppong et al.
6,029,445 A 2/2000 Lech
6,134,887 A 10/2000 Bertotti et al.
6,318,079 B1 11/2001 Barber
6,976,357 B1 * 12/2005 Pfaff .............................. 60/422
7,222,484 B1 * 5/2007 Dornbach ....................... 60/422
7,275,370 B2 10/2007 Hesse et al.
7,513,109 B2 4/2009 Toji et al.
8,713,930 B2 * 5/2014 Cheong .......................... 60/452
2009/0025380 A1 * 1/2009 Harsia ............................ 60/420
2012/0198831 A1 * 8/2012 Kodaka et al. .................. 60/422
2012/0233996 A1 9/2012 Quinnell et al.

* cited by examiner

*Primary Examiner* — Thomas E Lazo
*Assistant Examiner* — Matthew Wiblin
(74) *Attorney, Agent, or Firm* — Quarles & Brady LLP

(57) ABSTRACT

A system has a variable displacement pump that supplies pressurized fluid to power a plurality of hydraulic functions. Each hydraulic function has a control valve with a variable source orifice controlling fluid flow between the pump and a flow summation node, and a variable metering orifice controlling fluid flow between the flow summation node and a hydraulic actuator. Variable bypass orifices in the control valves are connected in series between the flow summation node and a tank. As the metering orifice in a control valve enlarges, the source orifice enlarges and the bypass orifice shrinks. This alters pressure at the flow summation node, which is used to control the output of the pump. Components are provided to give selected hydraulic functions different levels of priority with respect to consuming fluid flow from the pump.

24 Claims, 5 Drawing Sheets

HYDRAULIC SYSTEM WITH FLUID FLOW SUMMATION CONTROL OF A VARIABLE DISPLACEMENT PUMP AND PRIORITY ALLOCATION OF FLUID FLOW

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to valve assemblies for operating hydraulically powered machinery; and more particularly to such valve assemblies that produce a pressure signal which controls a variable displacement hydraulic pump and that give priority to the use of fluid from the pump to operate selected hydraulic actuators.

2. Description of the Related Art

The speed of a hydraulically driven working member on a machine depends upon the cross-sectional area of principal narrowed orifices of the hydraulic system and the pressure drop across those orifices. To facilitate control, pressure compensating hydraulic control systems have been designed to manage the pressure drop. These previous control systems include load sense conduits which transmit the pressure at the valve workports to the input of a variable displacement hydraulic pump supplying pressurized hydraulic fluid in the system. The resulting self adjustment of the pump output provides an approximately constant pressure drop across a control orifice whose cross-sectional area can be controlled by the machine operator. This facilitates control because, with the pressure drop held constant, the speed of movement of the working member is determined by the cross-sectional area of the orifice.

One such system is disclosed in U.S. Pat. No. 5,715,865 entitled “Pressure Compensating Hydraulic Control Valve System” in which a separate valve section controls the flow of hydraulic fluid from the pump to each hydraulic actuator that drive a working member. The valve sections are of a type in which the greatest load pressure acting on the hydraulic actuators is sensed to provide a load sense pressure which is transmitted to the control input port of the pump. The greatest load pressure is determined by daisy chain of shuttle valves that receives the load pressure from all the valve sections.

Each valve section includes a control valve, with a variable metering orifice, and a separate pressure compensating valve. The output pressure from the pump is applied to one side of the metering orifice and the pressure compensating valve at the other side of the metering orifice, responds to the load sense pressure, so that the pressure drop across the metering orifice is held substantially constant.

While this system is effective, it requires a separate pressure compensating valve and a shuttle valve in each valve section, in addition to the control valve that has the metering orifice. These additional components add cost and complexity to the hydraulic system, which can be an important consideration for less expensive machines Thus, there is need for a less expensive and less complex technique for performing this function.

On some machines, selected hydraulic functions have operational priority over other hydraulic functions. Thus it is necessary to ensure that the demands for supply fluid of the higher priority functions are met to the greatest possible degree, even if doing so results in lower performance of other hydraulic functions. Previous flow priority techniques often had losses in efficiency, such as heat losses. Thus there remains a need for other techniques for implementing hydraulic function priority. In addition, some machines required more than two levels of hydraulic function priority.

SUMMARY OF THE INVENTION

A control valve assembly is provided for a hydraulic system in which a variable displacement pump sends fluid, drawn from a tank, into a supply conduit for operating a plurality of hydraulic functions. Each hydraulic function has a hydraulic actuator and a control valve that controls the flow of fluid from the supply conduit to the hydraulic actuator. Fluid from the hydraulic actuator in each hydraulic function is conveyed via a return conduit to the tank.

A flow summation node is provided in the control valve assembly. A first supply node is connected to both a first hydraulic function and the flow summation node. A second supply node is connected to a second hydraulic function.

All the control valves have a variable first path through which fluid flows from the pump to the flow summation node, and a variable second path through which fluid flows to the associated hydraulic actuator from the first or second supply node related to the respective hydraulic function. Every control valve also includes a variable third path, wherein all those third paths are connected in series between the flow summation node and the return conduit, thereby forming a bypass passage. Reference to a variable path herein means that the amount of fluid flow through that path can be varied during operation of the hydraulic system. In one embodiment of the present invention, each control valve comprises (1) a variable source orifice in the first path, (2) a variable metering orifice in the second path, and (3) a variable bypass orifice in the third path. Those orifices change in size to enlarge and shrink the respective variable path and thus increase and decrease the amount of fluid flow there through.

Each control valve is configured so that as variable metering orifice in the second path is increased in size to operate the associated hydraulic actuator, the variable source orifice in the first path also increases proportionally in size to convey more fluid from the supply conduit to the flow summation node. At the same time, the bypass orifice in the third path reduces proportionally in size to restrict the flow of fluid from the flow summation node to the return conduit. That operation of the control valve varies pressure at the flow summation node which pressure is applied to operate a variable displacement margin controlled pump. The pump responds by controlling the fluid flow into the supply conduit in order to satisfy the demands of the control valve.

The control valve assembly further includes a first priority check valve through which fluid flows into the second supply node from a point in the bypass passage that is between first and second hydraulic functions. Fluid also is able to flow from the flow summation node to the second supply node through a fixed first supply orifice.

The first priority check valve and the fixed first supply orifice function to give the first hydraulic function priority to consume the output flow from the pump. The first supply node is preferably directly connected to the flow summation node, so that fluid is furnished substantially unrestricted to the first hydraulic function. As a result, the first hydraulic function has the highest priority to use the fluid supplied by the pump.

When only the second hydraulic function is operating, fluid from the pump passes freely from the flow summation node through the third path of the control valve in the first hydraulic function and into the bypass passage. The third path of the control valve in the second hydraulic function now is reduced in size restricting flow farther to the return conduit. As a result, fluid flows from the bypass passage through a first priority check valve to the second supply node, where that fluid is available relatively unrestricted to power the hydraulic actuator in the second hydraulic function.

Assume now that both the first and second hydraulic functions are active simultaneously. The first supply node for the first hydraulic function receives relatively unrestricted fluid flow from the flow summation node. The reduced third path of the control valve in the first hydraulic function limits flow through the bypass passage to the second hydraulic function. Therefore, fluid is furnished from the flow summation node into the second supply node primarily through the fixed first supply orifice. The restriction provided by the fixed first supply orifice impedes the supply flow to the second supply node and thus to the second hydraulic function. As a result, the first hydraulic function has priority over the second hydraulic function with respect to use of the pump output flow present at the flow summation node.

DETAILED DESCRIPTION OF THE INVENTION

The term "directly connected" and "directly connects" as used herein means that the associated components are connected together by a conduit without any intervening element, such as a valve, an orifice or other device, which restricts or controls the flow of fluid beyond the inherent restriction of any conduit. If a component is described as being "directly connected" between two points or hydraulic circuit nodes, that component is directly connected to each such point or node.

Although the present invention is being described in the context of use on an earth excavator, it can be implemented on other hydraulically operated machines.

Figure 1:
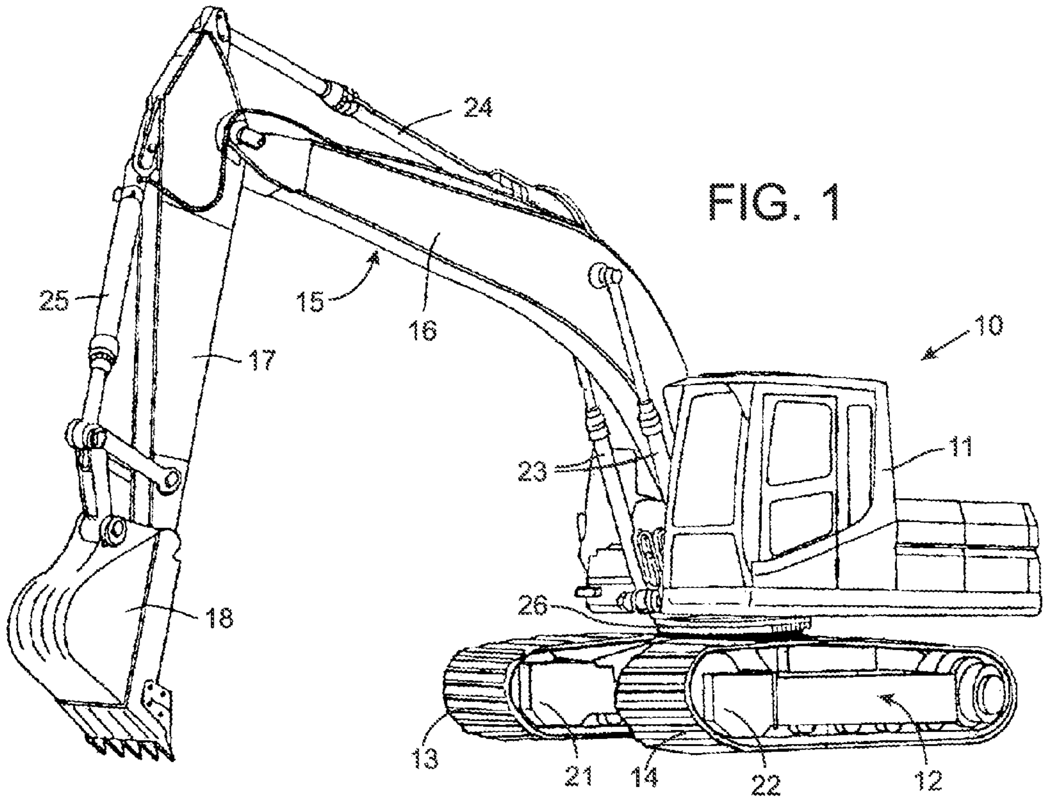
FIG. 1 is a pictorial view of an excavator that incorporates a hydraulic system.

With initial reference to FIG. 1, an excavator 10 comprises a cab 11 that can swing clockwise and counter-clockwise on a crawler 12 when driven by a hydraulic motor 26. The crawler 12 is propelled by right and left tracks 13 and 14 that are driven by separate hydraulic motors 21 and 22, respectively.

A boom assembly 15, attached to the cab, is subdivided into a boom 16, an arm 17, and a bucket 18 pivotally attached to each other. A pair of hydraulic piston-cylinder assemblies 23, that are mechanically and hydraulically connected in parallel, raise and lower the boom 16 with respect to the cab 11.

On a typical excavator, the cylinder of these assemblies 23 is attached to the cab 11 while the piston rod is attached to the boom 16, thus the force of gravity acting on the boom tends to retract the piston rod into the cylinder. Nevertheless, the connection of the piston-cylinder assemblies 23 could be such that gravity tends to extend the piston rod from the cylinder. The arm 17, supported at the remote end of the boom 16, can pivot forward and backward in response to operation of another hydraulic piston-cylinder assembly 24. The bucket 18 pivots at the tip of the arm 17 when driven by yet another hydraulic piston-cylinder assembly 25. The bucket 18 can be replaced by other work heads.

The hydraulic motors 21, 22 and 26 and the hydraulic piston-cylinder assemblies 23, 24 and 25 on the boom assembly 15 are generically referred to as "hydraulic actuators," a class of devices that convert hydraulic fluid flow into mechanical motion. A particular hydraulic system may include other types of hydraulic actuators. To simplify the description herein, the pair of piston-cylinder assemblies 23, that operate in tandem to raise and lower the boom, will be considered as a single hydraulic actuator.

Figure 2:
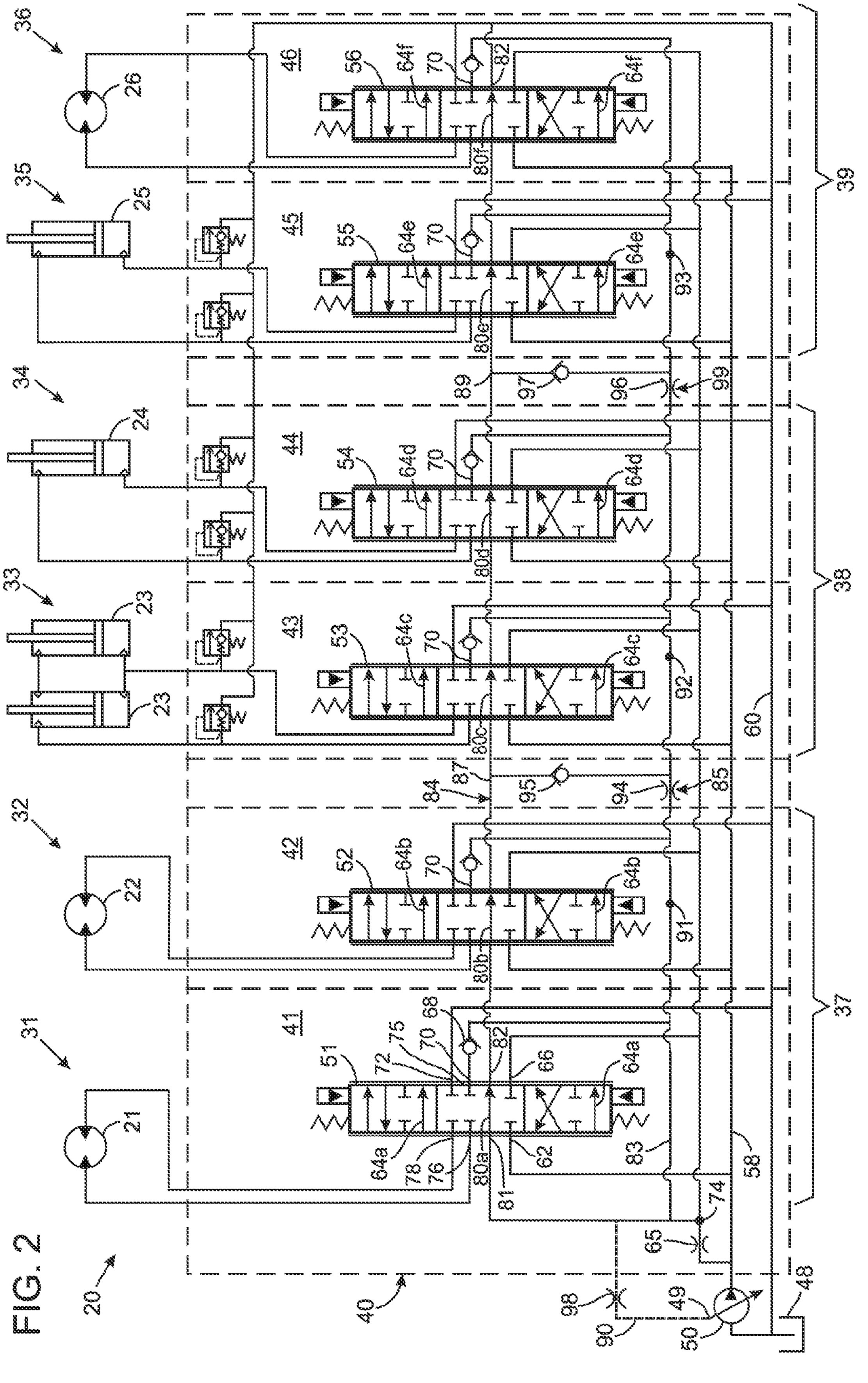
FIG. 2 is a diagram of a first embodiment of a hydraulic system according to of the present invention.

With particular reference to FIG. 2, a hydraulic system 20 for the excavator 10 has six hydraulic functions 31-36, although a greater or lesser number of such functions may be used in other hydraulic systems that employ the present invention. Specifically, there are left and right travel hydraulic functions 31 and 32 that include the hydraulic motors 21 and 22 for the tracks, a boom hydraulic function 33, an arm hydraulic function 34, a bucket hydraulic function 35, and a cab swing hydraulic function 36. The left and right travel hydraulic functions 31 and 32 comprise a first priority section 37 and the boom and arm hydraulic functions 33 and 34 comprise a second priority section 38. A third priority section 39 includes the bucket and a swing hydraulic functions 35 and 36. It should be understood that the six hydraulic functions may be grouped differently into the priority sections and that a greater or lesser number of priority sections may be provided on a particular machine.

Each hydraulic function 31, 32, 33, 34, 35 and 36 respectively comprises one of the hydraulic actuators 21, 22, 23, 24, 25 and 26 and a valve unit 41, 42, 43, 44, 45 and 46. The six valve units combine to form a control valve assembly 40, that has either six physically separate sections attached side by side or a single monolithic body. The first valve unit 41 has a first control valve 51, the second valve unit 42 has a second control valve 52, and the third valve unit 43 has a third control valve 53. The fourth valve unit 44 has a fourth control valve 54, the fifth valve unit 45 has a fifth control valve 55, and the sixth valve unit 46 has a sixth control valve 56. Each control valve 51, 52, 53, 54, 55 and 56 controls the flow of fluid between the associated hydraulic actuator 21, 22, 23, 24, 25 and 26, respectively, and both a variable-displacement pump 50 and a tank 48.

The pump 50 furnishes pressurized fluid to a supply conduit 58 and is of a type such that its output pressure is equal to a pressure applied to a control port 49 plus a fixed predefined amount referred to as the "pump margin". The displacement of the pump 50 increases or decreases in order to maintain the pump margin. Fluid also flows into the tank 48 through a return conduit 60. The supply conduit 58 and return conduit 60 extend to each of the valve units 41-46.

The supply conduit 58 is connected via a relatively small fixed inlet orifice 65 to a flow summation node 74 defined by another passage that extends through all the valve units 41-46. The flow summation node 74 in turn is connected to a first supply node 91, a second supply node 92, and a third supply node 93. In the embodiment of the present invention incorporated into the first hydraulic system 20, the three supply nodes 91, 92 and 93 are connected in series. Specifically, the first supply node 91 is directly connected to the flow summation node 74 by a first passageway 83 and is connected to the second supply node 92 by a fixed first supply orifice 94 which forms a second passageway 85. The second supply node 92 is connected to the third supply node 93 by a fixed second supply orifice 96 which forms a third passageway 99. In the first hydraulic system, the first supply node 91 is located in the first priority section 37, the second supply node 92 in the second priority section 38, and the third supply node 93 is located in the third priority section 39.

Each of the control valves 51-56 is an open-center, three-position valve and may be a spool type valve, for example. Although in the exemplary first hydraulic system 20, the control valves 51-56 are indicated as being pilot operated, one or more of them could be operated by a solenoid, a mechanical linkage, or another type of operator.

The first control valve 51 will be described in detail with the understanding that the description also applies to the other five control valves 52-56. The first control valve 51 has a supply port 62 that is directly connected to the supply conduit 58. A variable source orifice 64 within the control valve provides variable flow, fluid communication between the supply port 62 and a flow outlet 66, thereby forming a variable first path through the control valve. To facilitate understanding a subsequent operational description of the first hydraulic system 20, the variable source orifices 64 for each of the control valves 51, 52, 53, 54, 55 and 56 are identified by numerals as orifices 64*a*, 64*b*, 64*c*, 64*d*, 64*e* and 64*f*, respectively. The flow outlet 66 of the first control valve 51 is directly connected to the flow summation node 74. Thus, the variable source orifices 64*a*-64*f* within the control valves 51-56 are connected in parallel between the supply conduit 58 and the flow summation node 74 and provide a separate variable first paths there between, as more graphically shown in FIG. 3.

Returning to FIG. 2, the first control valve 51 has a metering orifice inlet 70 coupled by a conventional load check valve 68 to the supply node associated with the corresponding valve unit. The metering orifice inlet 70 for the first and second valves 51 and 52 are coupled to the first supply node 91, the metering orifice inlet for the third and fourth valves 53 and 55 are coupled to the second supply node 92, and the metering orifice inlet 70 for the fifth and sixth valves 55 and 56 are coupled to the third supply node 93. The load check valve 68 prevents fluid flow from the metering orifice inlet 70 back into associated supply node when a large load acts on the hydraulic actuator connected to that valve. A variable metering orifice 75 within the first control valve 51 connects the metering orifice inlet 70 to one of two workports 76 and 78 depending upon the direction that the first control valve is moved from the center, neutral position, that is illustrated. The variable metering orifice 75 defines a variable second path through the control valve. The two workports 76 and 78 connect to different ports on the first hydraulic actuator 21. The first control valve 51 is normally biased into the center position in which both workports 76 and 78 are closed.

The first control valve 51 also has a bypass orifice 80*a* directly connected between a bypass inlet 81 and a bypass outlet 82 of that control valve, thereby forming a third variable through the control valve. The bypass orifices for the other control valves 52, 53, 54, 55 and 56 are identified as 80*b*, 80*c*, 80*d*, 80*e*, and 80*f*, respectively. The bypass orifices 80*a*-80*f* are connected in series to form a bypass passage 84 that provides a fluid path between the flow summation node 74 and the return conduit 60, as more graphically shown in FIG. 3. In that series, the flow summation node 74 is directly connected to the bypass inlet 81 of the first control valve 51 and the bypass outlet 82 of the sixth control valve 56 is directly connected to the return conduit 60.

Figure 3:
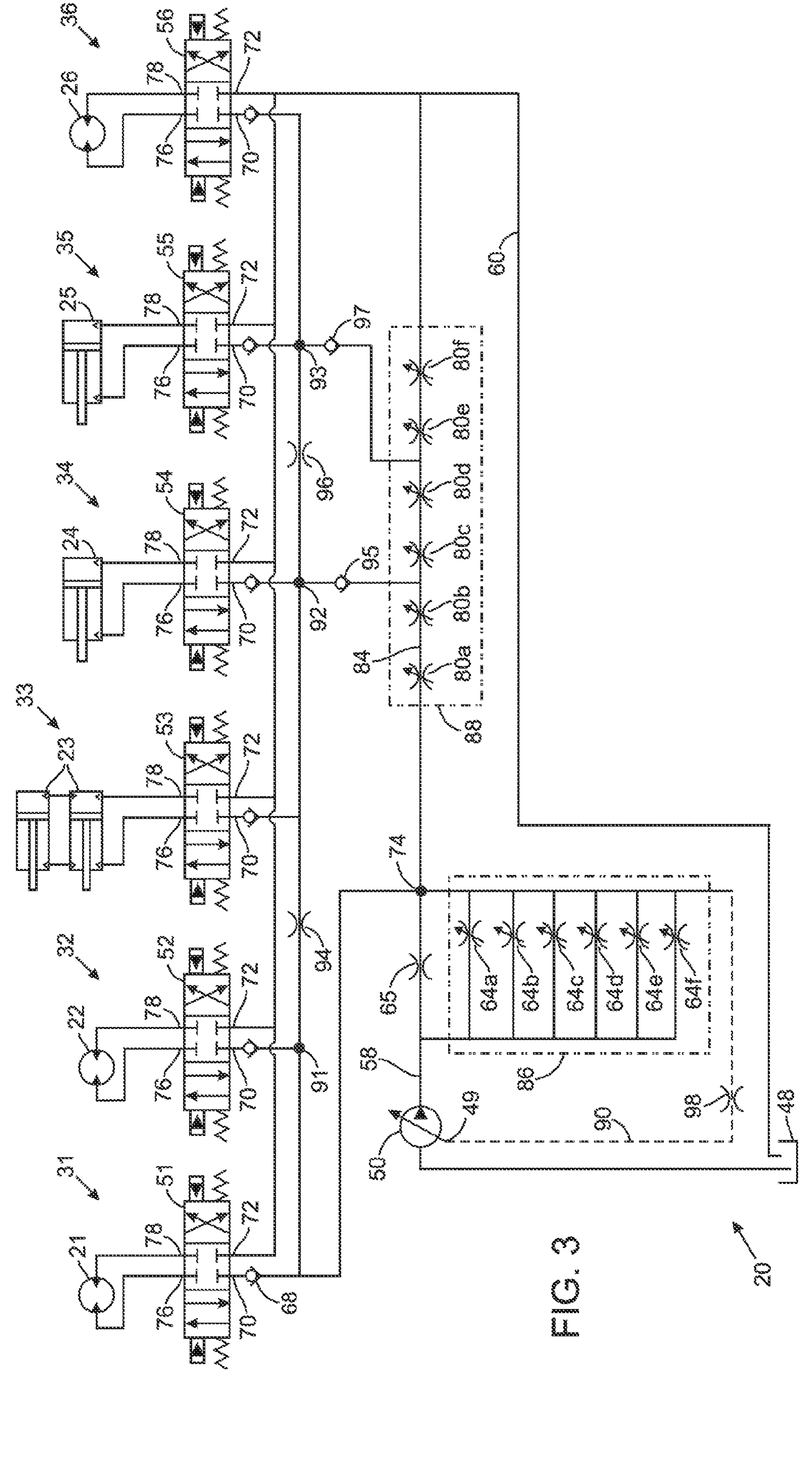
FIG. 3 is a schematic diagram of the hydraulic system in FIG. 2 with certain internal components separated from the control valves and rearranged for a better understanding of their functional relationships.

FIG. 3 is a schematic diagram of the first hydraulic system 20 in which the variable source orifices 64*a*-64*f* and the bypass orifices 80*a*-80*f* are arranged in more functional groupings with those respective orifices shown outside the corresponding control valve 51-56 in which they are actually located. This functional diagram shows that the six variable source orifices 64*a*-64*f* and the relatively small fixed inlet orifice 65 are connected in parallel directly between the supply conduit 58 and the flow summation node 74. This parallel connection forms a variable flow section 86. The six bypass orifices 80*a*-80*f* are connected in series between the flow summation node 74 and the return conduit 60 to the tank 48 and form a bypass section 88 in the first hydraulic system 20.

Pump Displacement Control

Assume that all the control valves 51-56 are in the center position in which both their workports 76 and 78 are closed. In that state, the output from the pump 50, applied to the supply conduit 58, passes to the flow summation node 74 only through the relatively small fixed inlet orifice 65, because all the variable source orifices 64*a*-64*f* are closed. Therefore, only a relatively small amount of fluid flows from the pump 50 to the flow summation node 74. In this state of the control valves 51-56, all the bypass orifices 80*a*-80*f* in the bypass section 88 are opened to their maximum amount to provide relatively large flow areas. This allows the fluid entering the flow summation node 74 to pass easily through the bypass section 88 into the return conduit 60. As a consequence, the pressure at the flow summation node 74 is at a relatively low level and that pressure is transmitted through a fixed control orifice 98 and a pump control conduit 90 to the control port 49 of the variable displacement pump 50.

Assume now that the left travel hydraulic function 31 in the first priority section 37 is commanded to operate by the person using the excavator 10. The displacing the first control valve 51 in either direction from the center position connects the metering orifice inlet 70 through the variable metering orifice 75 to one of the workports 76 or 78, depending upon the direction of that motion. As the valve is displaced farther the metering orifice, and thus the flow path it provides, enlarges. Displacing the first control valve 51 also connects the other workport 78 or 76 to the outlet port 72 that leads to the return conduit 60. At the same time, the variable source orifice 64*a* also enlarges by an amount related to the distance that the control valve moves, thereby increasing fluid flow from the pump 50 to the flow summation node 74. Concurrently the valve displacement causes the size of the bypass orifice 80*a* to shrink, resulting in an increase in pressure at the flow summation node 74. Enlarging an orifice, and thus the fluid path it provides, reduces restriction to fluid flow in that path. Inversely, shrinking an orifice, and thus the associated fluid path, increases the restriction to fluid flow in that path. In summary, as the first control valve 51 opens its second path conveying fluid to the first hydraulic actuator 21, the pump output flow through the first path into the flow summation node 74 increases and that flow passes through the bypass passage 84 to tank. That combined action increases pressure at the flow summation node 74. This pressure increase is communicated through the pump control conduit 90 to the control port 49 of the pump 50, thereby increasing the pump output pressure. When the flow summation node pressure is sufficiently great to overcome the load force acting on the first actuator 21, fluid begins to flow through the metering orifice 75 in the first control valve 51 to drive the first actuator. When fluid flow commences to the hydraulic actuator, the flow in the first control valve's third path that is part of the bypass passage 84 from the flow summation node to the tank decreases.

When the first hydraulic actuator 21 reaches the desired position, the first control valve 51 is returned to the center position by whatever mechanism controls that valve. In the center position, the two workports 76 and 78 are closed again cutting off fluid flow from the flow summation node 74 to the first hydraulic actuator 21. In addition, the variable source orifice 64*a* shrinks to a relatively small size which reduces the flow from the supply conduit 58 to the flow summation node 74. Returning the first control valve 51 to the center position also enlarges the size of the bypass orifice 80*a*. Now if the other control valves 52-56 also are in the center position, all their bypass orifices 80*a-c* are relatively large thereby relieving the flow summation node pressure into the return conduit 60.

At the same time, that the first control valve 51 is displaced from center, one or more of the other control valves 52-58 also may be displaced. Their respective variable source orifices 64*b*-64*f* also convey additional fluid flow from the supply conduit 58 into the flow summation node 74. Because all the source orifices 64*a*-64*f* and the fixed inlet orifice 65 are connected in parallel, the same pressure differential is across each of those orifices. Since the pressure differential is controlled by the pump 50 to a fixed margin, the cross sectional area of each source orifice determines the amount of flow through that orifice. The total flow into the flow summation node is the aggregate of the individual flows through all of the variable source orifices 64*a*-64*f*. As a result, the sum of the areas that each variable source orifice is open determines the aggregate flow into the flow summation node 74 and thus determines the output flow from the variable displacement pump 50. The respective flow area of the metering orifice 75 in each control valves 51-56 and the respective load forces on actuators 21-26 determine the amount of flow each actuator receives from the flow summation node 74. When multiple hydraulic functions 31-36 are active simultaneously, their combine operation determines the pressure at the flow summation node 74 and thus the output of the pump.

Hydraulic Function Fluid Flow Priority

The two travel hydraulic functions 31 and 32 in the first priority section 37 consume fluid from the first supply node 91 to operate the respective hydraulic actuators 21 and 22. Because the first supply node 91 is directly connected by a first passageway 85 to the flow summation node 74, those hydraulic functions are supplied with fluid from first supply node without restriction regardless whether another hydraulic function 33-36 also is operating. As a consequence, the travel hydraulic functions 31 and 32 usually can receive that amount of fluid flow that is demanded. Alternatively a fixed or variable restriction, such as a orifice, could be place in the first passageway 85.

When only one or both of the boom and arm hydraulic functions 33 and 34 in the second priority section 38 is operating, fluid from the pump 50 passes through the now opened source orifice 64*c* or 64*d* for that hydraulic function and into the flow summation node 74. The bypass orifice 80*c* or 80*d* of the operating hydraulic function closes, thereby increasing pressure at the flow summation node, as described previously. Fluid flows from the flow summation node 74 through the fully opened bypass orifices 80*a* and 80*b* in the first and second hydraulic valves 51 and 52 in the now non-operating travel hydraulic functions 31 and 32. This conveys fluid through the bypass passage 84 to a location 87 between the right travel and boom hydraulic functions 32 and 33, i.e. between the first and second priority sections 37 and 38. From that location 87, the fluid flows through a first priority check valve 95 to the second supply node 92. Some fluid also flows through the first supply node 91 and the first supply orifice 94 to the second supply node 92. From the second supply node 92 the fluid is conveyed through the metering orifice of the control valve 53 or 54 for the now operating hydraulic function 33 or 34.

Thus when both travel hydraulic functions 31 and 32 in the first priority section 37 are inactive and either the boom or arm hydraulic functions 33 or 34 in the second priority section 38 operates, fluid is supplied essentially unrestricted through the bypass passage 84 to location 87 and then through the first priority check valve 95 to the second supply node 92.

Assume now that all the hydraulic functions 31-34 in the first and second priority sections 37 and 38 are inactive and one or both of the bucket and swing hydraulic functions 35 and 36 in the third priority section 38 is active. Fluid is conveyed from the flow summation node 74 through the bypass orifices 80*a*, 80*b*, 80*c*, and 80*d* in the inactive hydraulic functions 31-34 to a location 89 in the bypass passage 84 between the arm and bucket hydraulic functions 34 and 35, i.e. between the second and third priority sections 38 and 39. The bypass orifice 80*e* or 80*f* in the operating bucket or swing hydraulic function closes, i.e. reduces in size, in proportion to the amount that the metering orifice of that function opens, thereby restricting flow through the bypass passage 84 at the control valve 55 or 56. The fluid at location 89 in the bypass passage 84 continues to flow through the second priority check valve 97 to the second supply node 93. Some fluid also flows serially through the first supply node 91, the first supply orifice 94, the second supply node 92, and the second supply orifice 96, to the third supply node 93. Fluid at that third supply node 93 then is conveyed by the metering orifice in the active bucket or swing hydraulic function 35 or 36 to the respective hydraulic actuator 25 or 26.

In summary, when none of the hydraulic functions 31-34 in the first and second priority sections 37 and 38 is active and a hydraulic function 35 and 36 in the third priority section 39 operates, fluid is supplied essentially unrestricted through the bypass passage 84 to location 89 and then through the second priority check valve 97 to the third supply node 93.

Now consider the situation in which hydraulic functions in more than one priority section 37, 38 and 39 are operating simultaneously. In this case, the first hydraulic system 20 allocates the available hydraulic fluid from the pump 50 to different ones of those hydraulic functions based on the predefined series priority scheme. Fluid is supplied from the flow summation node 74 sequentially through the supply nodes 91, 92, and 93 that are connected in a series by the fixed supply orifices 94 and 96. Those orifices restrict the flow from one supply node to another in that sequence thereby giving a higher flow use priority based on the number of orifices, if any, that the fluid has to flow through to reach a given hydraulic function. The more orifices the lower the priority.

For example, assume that the left travel hydraulic function 31 is operating at the same time that the boom hydraulic function 33 is commanded to operate. Supply fluid for driving the left track hydraulic actuator 21 is conveyed unrestricted from the flow summation node 74 to the first supply node 91 in the first priority section 37. Because the first control valve 51 for the left travel hydraulic function 31 is moved from the center position, flow of fluid through the bypass passage 84 is restricted by the reduction in size of the first bypass orifice 80*a* in proportion to the amount that the associated metering orifice 75 of that function opens. Thus, a limited amount of fluid flows from the bypass passage 84 through the first priority check valve 95 to the second supply node 92 that feeds the boom hydraulic function 33 in the second priority section 38. Instead, fluid can flow into the second supply node 92 primarily through the fixed first supply orifice 94 connected to the first supply node 91. The restriction provided by the fixed first supply orifice 94 controls the proportioning of fluid flow between the left travel hydraulic function 31 that has a higher priority for the use of the pump output flow and the boom hydraulic function 33 that has a lower flow use priority. Thus, the left travel hydraulic function is able to consume as much of the flow as it demands, whereas operation of the boom hydraulic function 33 now is limited to the remaining flow that can pass through the fixed first supply orifice 94.

A similar condition occurs, for example, when only the left travel hydraulic function 31 and a hydraulic function in the third priority section 39 are operating simultaneously. In this case the left travel hydraulic function 31 still has the first priority to use the pump output flow and the bypass passage 84 is closed at the bypass orifice 80*a* in the first control valve 51. Fluid is supplied to the third priority section 39, e.g. to the swing hydraulic function 36, primarily through both the first and second supply orifices 94 and 96. Those orifices provide greater restriction to flow to the third supply node than restriction of flow to the first supply node 91. As a result the hydraulic function in the third priority section 39 has a lower priority to use the output flow of the pump compared to the left travel hydraulic function.

Assume another condition exists in which both travel hydraulic functions 31 and 32 are inactive, while a function in each of the second and third priority sections 38 and 39 are active. For example, consider that the arm hydraulic function 34 and the bucket hydraulic function 35 are both operating. Now operation of the fourth control valve 54, a specifically proportional reduction in size of bypass orifice 80*d*, restricts flow through the bypass passage 84 at that valve. Nevertheless, flow from the flow summation node 74 in conveyed in the bypass passage 84 to location 87 from which the flow continues relatively unrestricted through the first priority check valve 95 to the second supply node 92. Some additional fluid reaches the second supply node 93 through the first supply orifice 94. That combined fluid flow is available for use by the arm hydraulic function 34.

Because the bypass passage 84 is restricted in the second priority section 38, the bucket hydraulic function 35 receives fluid from the flow summation node 74 primarily through both the first and second supply orifices 94 and 96. Those orifices provide a greater restriction to the flow into the third supply node 93 than restriction of flow to the second supply node 92. As a result, the bucket hydraulic function has a lower priority for using the output flow of the pump as compared to the arm hydraulic function.

In yet another situation, when hydraulic functions in all three priority sections 37-39 are active simultaneously, the travel hydraulic functions 31 and 32 have first priority to use the pump output flow. That is because those functions are connected to the first supply node 91 which receives fluid essentially unrestricted from the flow summation node 74. Now the bypass passage 84 is restricted by the proportional reduction in size of the bypass orifice 80*a* or 80*b* in a control valve 51 or 52 in the first priority section 37. Next in priority are the boom and arm hydraulic functions 33 and 34, which receive fluid from the flow summation node 74 primarily through the first supply orifice 94. That supply orifice provides a single restriction to flow into the second supply node 92, whereas there is essentially no restriction to supply flow into the first supply node 91 in the first priority section 37. The bucket and swing hydraulic functions 35 and 36 in the third priority section 38 are supplied with fluid through both the first and second supply orifices 94 and 96. Thus there are two restrictions to flow into the second supply node 92 and the bucket and swing hydraulic functions 35 and 36 connected to the second supply node have the lowest fluid use priority.

In summary, the first hydraulic system 20 has the different hydraulic functions 31-36 grouped into three priority levels. The travel hydraulic functions 31 and 32 in the first priority section 37 have the highest priority level because the first supply node 91 is directly connected to the flow summation node 74. The boom and arm hydraulic functions 33 and 34 in the second priority section 38 have an intermediate priority level, since under certain conditions supply fluid can reach the second supply node 92 only through flow restrictions. Finally the bucket and swing hydraulic functions 35 and 36 in the third priority section 39 have the lowest priority level because under certain conditions supply fluid can reach the third supply node 93 only through multiple flow restrictions in series.

Figure 4:
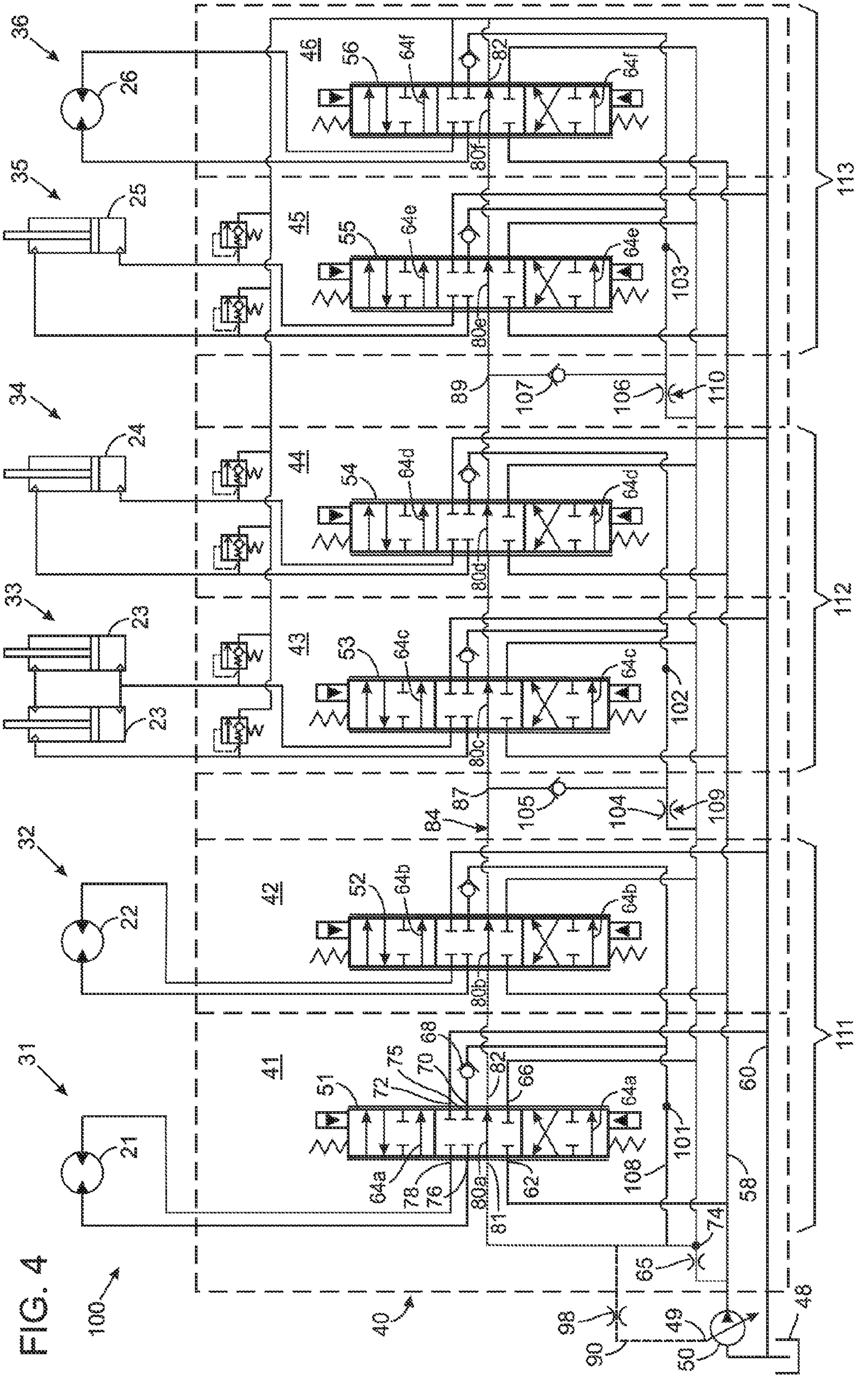
FIG. 4 is a diagram of a second embodiment of a hydraulic system for the excavator.

With reference to FIG. 4, a second hydraulic system 100 incorporating the concepts of the present invention has similar components as the first hydraulic system 20, and those components have been assigned identical reference numerals. The difference between those systems being how fluid from the flow summation node 74 flows to the three supply nodes 101, 102, and 103 for the six hydraulic functions 31-36. Whereas in the first hydraulic system 20, the three supply nodes 90-93 are connected in series by fixed supply orifices 94 and 96, in the second hydraulic system 100, the three supply nodes 101, 102 and 103 are connected in parallel to the flow summation node 74 by first, second and third passageways 108, 109 and 110, respectively.

Specifically the first supply node 101, in the first priority section 111, is directly connected via the first passageway 108 to the flow summation node 74 so that the travel hydraulic functions 31 and 32 are supplied with fluid essentially without restriction. The second supply node 102, in the second priority section 112, is connected to the flow summation node 74 by a fixed first supply orifice 104 in the second passageway 109, that provides a first amount of restriction to fluid flowing from the flow summation node. The second supply node 102 is also connected by a first priority check valve 105 to the bypass passage 84 at a location 87 between the first and second priority sections 111 and 112, i.e., at a location between the right travel and boom hydraulic functions 32 and 33. In a similar fashion, the third supply node 103, in the third priority section 113, is connected to the flow summation node 74 by a fixed second supply orifice 106 in the third passageway 110. The second supply orifice 106 provides a second amount of restriction to fluid flowing from the flow summation node. A second priority check valve 107 couples the third supply node 103 to a location 89 in the bypass passage 84 that is between second and third priority sections 112 and 113, i.e., at a location between the arm and bucket hydraulic functions 34 and 35. The two priority check valves 105 and 107 permit fluid to flow only in a direction from the bypass passage 84 to the respective supply node 102 or 103. It should be understood that a greater or lesser number of hydraulic functions may be connected to each of the three supply nodes 101, 102, and 103. In addition, the hydraulic functions can be divided into more than three priority sections.

Fluid is supplied to the boom and arm hydraulic functions 33-34 in the second priority section 112 from the bypass passage 84 via the first priority check valve 105, when flow is available from the first passage location 87. Otherwise, if any one of the travel hydraulic functions 31 or 32 is active and its bypass orifice 80*a* or 80*b* is at least partially closed, fluid is supplied to boom and arm hydraulic functions 33-34 primarily through the first supply orifice 104. Similarly, fluid is supplied to the bucket and swing hydraulic functions 35-36 in the third priority section 113 from the bypass passage 84 via the second priority check valve 107 when flow is available at the second passage location 89. Otherwise, if any one of the travel hydraulic functions 31 and 34, the boom hydraulic function 33, or the arm hydraulic function 34 is active which results in a bypass orifice 80*a*-80*d* restricting flow through the bypass passage 84, fluid is supplied to the bucket and swing hydraulic functions 35 and 36 primarily through the second supply orifice 106.

The first and second supply orifices 104 and 106 are specifically sized to provide desired amounts of flow restriction that results in different levels of priority for the use of the pump output flow among the three priority sections 111-113. For example, the two travel hydraulic functions 31 and 32, connected to the first supply node 101, have the highest flow use priority because the associated supply node 101 is directly connected in an unrestricted manner to the flow summation node 74. If the second priority section 112 is to have the next highest flow use priority, the second supply orifice 106 has a smaller flow area, i.e., a greater restriction, than the flow area and restriction of the first supply orifice 104, so that the fluid flow will favor the second priority section 112 over the third priority section 113. Thus the relative sizes of the fixed first and second supply orifices 104 and 106 determines the priority relationship between the different hydraulic functions connected to the first and second supply nodes 102 and 103 when a travel function 31 or 31 is active.

Figure 5:
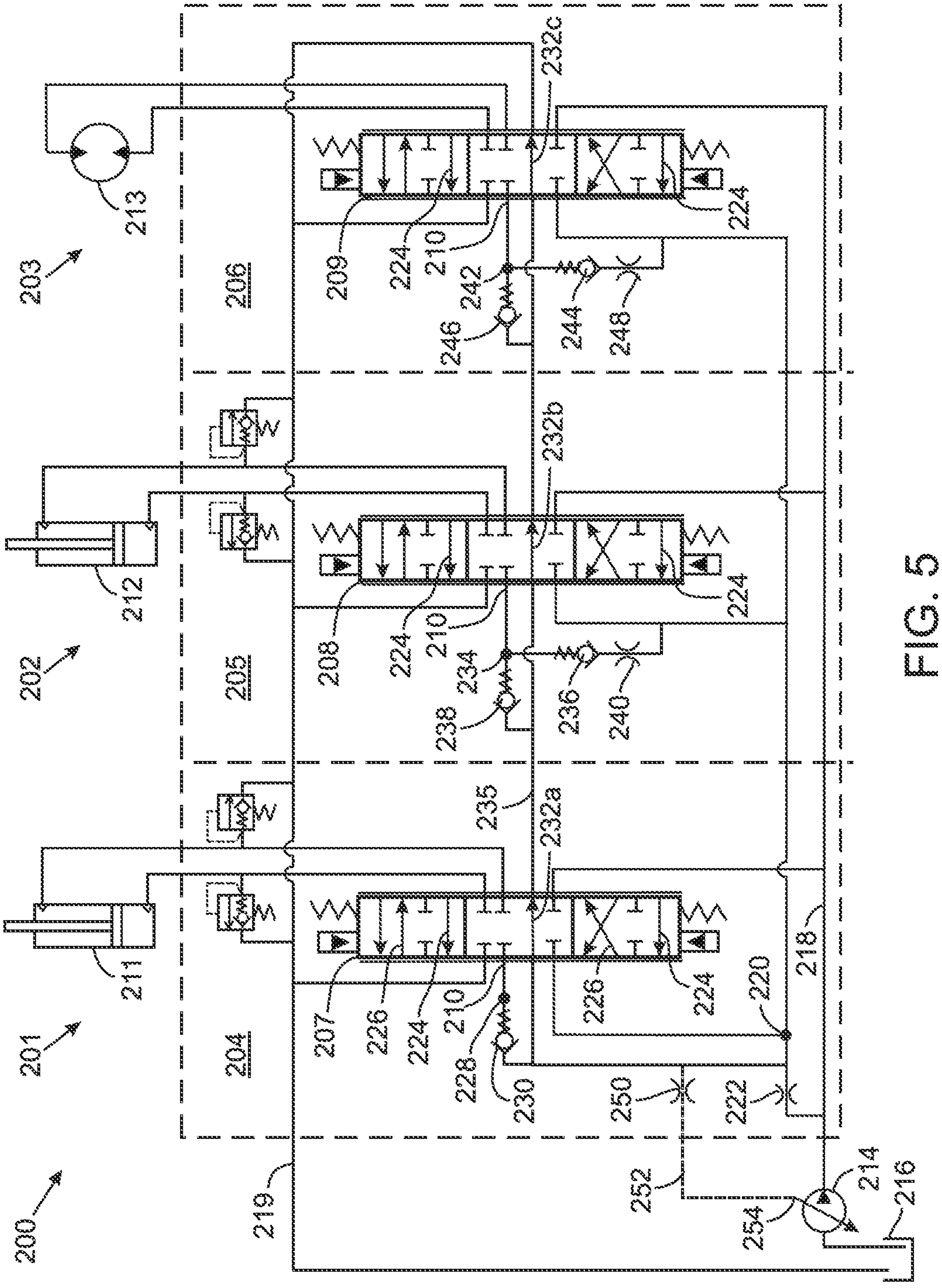
FIG. 5 is a diagram of a third embodiment of a hydraulic system.

With reference to FIG. 5, the flow summation pump displacement control technique can be applied to hydraulic systems in which each separate function is assigned its own priority level for the consumption of fluid flow produced by the pump. This is depicted in a third hydraulic system 200 with three hydraulic functions 201, 202, and 203. The first hydraulic function 201 comprises a first hydraulic actuator 211 connected to a first control valve 207 in a first control valve unit 204. The second hydraulic function 202 includes a second valve unit 205 with a second control valve 208 that governs the flow of fluid to and from a second hydraulic actuator 212. Finally the third hydraulic function 203 has a third hydraulic actuator 213 that receives from a third control valve 209 within a third valve unit 206.

The third hydraulic system 200 has a variable displacement pump 214 which draws fluid from a tank 216 and furnishes that fluid under pressure into a supply conduit 218. The supply conduit is connected to a flow summation node 220 by a primary fixed orifice 222. Pressure at the flow summation node 220 is conveyed by a fixed control orifice into a load sense conduit 252 that is connected to the control port 254 of the variable displacement pump 214. The level of that varies the output of the pump 214 in the same manner as described previously with respect to the first hydraulic system 20.

The three control valves 207, 208, and 209 are open-center, three-position valves and may be spool type valves, for example. Although the control valves 207-209 are indicated as being pilot operated, one or more of them can be operated by a solenoid, a mechanical linkage, or other type of operator.

The details of the first control valve 207 will be described with the understanding that this description also applies to the other two control valves 208 and 209. The first control valve 207 has a variable source orifice 224 which in the open states of that valve provides a first fluid path from the supply conduit 218 to the flow summation node 220. The variable source orifice 224 opens in proportion to the amount that the control valve opens to provide pressurized fluid to the first hydraulic actuator 211 and that action occurs when the valve moves away from the neutral center position, that is illustrated. Thus, the first path conveys an amount of fluid into the flow summation node 220 in proportion to the amount that the respective control valve opens. The first control valve 207 also has a metering orifice 226 that provides a variable second path between a metering orifice inlet 210 and one of the two workports coupled to the first hydraulic actuator 211. Which of those workports is connected by that second path is determined by the direction in which the first control valve 207 moves from the center position.

A variable bypass orifice 232*a* is provided in the center position and closes as the valve is moved from the center position. The second and third control valves 208 and 209 have similar bypass orifices 232*b* and 232*c*, respectively. The bypass orifices 232*a*, 232*b*, and 232*c* are connected in series to form a bypass passage 235 between the flow summation node 220 and a return conduit 219 that leads to the tank 216. Specifically, the bypass orifice 232*a* for the first control valve 207 is connected directly to the flow summation node 220 and the opposite end of the series connection provided by the bypass orifice 232*c* for the third control valve 209 in connected to the return conduit 219. When all the control valves 207-209 are in the center position, the bypass passage 235 provides a relatively unrestricted path for fluid to flow from the flow summation node 220 to the return conduit 219. That path is more restricted when one or more of the bypass orifices 232 proportionally reduces in size as its respective control valve is moved out of the center position.

The three control valves 207, 208, 209 differ in respect of how fluid is supplied to their metering orifice inlet 210. For the first control valve 207 the metering orifice inlet 210 is connected to a first supply node 228 that is coupled by a first check valve 230 directly to the flow summation node 220. The first check valve 230 allows fluid to flow only in a direction from the summation node to the supply node.

The metering orifice inlet 210 of the second control valve 208 has a similar second supply node 234 at that is coupled to the flow summation node 220 by a series connection of a second check valve 236 and a fixed first supply orifice 240. The first supply orifice 240 restricts the flow through that connection. The second supply node 234 also is coupled to the bypass passage 235 at the second control valve 208 by a third check valve 238, in a manner that permits fluid in the bypass passage to flow into the second supply node.

A third supply node 242, at an metering orifice inlet 210 of the third control valve 209, is coupled by a series connection of a fourth check valve 244 and a fixed second supply orifice 248 to the flow summation node 220. The second supply orifice 248 restricts the flow through that connection. The third supply node 242 also is coupled by a fourth check valve 244 to the section of the bypass passage 235 at the third control valve 209.

The third hydraulic system 200 operates in a similar manner to that of the second hydraulic system 100. In the third hydraulic system 200, however, each hydraulic function 210-203 is individually connected to the flow summation node 220, either directly in the case of the first hydraulic function 201 with the highest priority or via a separate fixed supply orifice 240 or 248. The size of the first and second supply orifices 240 and 248 are different wherein the associated hydraulic function, that has the smaller supply orifice, has a lower flow consumption priority than the other hydraulic function when the first hydraulic function 201 is active and its control valve 207 is displaced from the center position. It should be understood that additional hydraulic functions may be provided, each of which has a separate fixed supply orifice connecting the metering orifice inlet of the associated control valve to the flow summation node 220, in a manner that provides additional priority levels for the consumption of the output flow from the pump 214.

With the third hydraulic system 200, the first hydraulic function 201 receives fluid from the flow summation node 220 to drive the actuator 211 through the load holding check valve 230 and the first supply node 228. The first hydraulic function 201 receives fluid in that manner regardless of whether any of the other hydraulic functions 202 or 203 also is active. If the second or third hydraulic function 202 or 203 is the only one that is active, fluid will reach that function's supply node 234 or 242 from the bypass passage 235 via the associated check valve 238 or 244.

If, however, the second or third hydraulic function 202 or 203 is active at the same time that the first hydraulic function 201 is active, the now at least partially closed bypass orifice 232*a* in the first control valve 207 restricts flow into the bypass passage 235. As a result, the second or third hydraulic function 202 or 203 receives fluid at its respective second or third supply node 234 or 242 primarily through the fixed supply orifice 240 or 248, respectively. That supply orifice restricts the flow of fluid from the flow summation node 220 to the associated function giving a higher priority to the use of the pump output flow to the first hydraulic function 201.

In another situation, when both the second and third hydraulic functions 202 and 203 are operating at the same time, the second hydraulic function 202 receives fluid at its supply node 234 from the bypass passage 235, assuming that the first hydraulic function 201 is inactive. The proportionally reduced bypass orifice 232*b* in the second control valve 208 restricts transmission of a significant amount of fluid through the bypass passage 235 to the third hydraulic function 203. As a result, the third control valve 209 in the third hydraulic function 203 receives fluid at its supply node 242 primarily through the fixed third supply orifice 248. Therefore, in this instance, the second hydraulic function 202 gets flow relatively unrestricted via the bypass passage 235 and the third hydraulic function 203 receives restricted fluid flow and thus has a lower priority to the use of fluid supplied by the pump 214.

The foregoing description was primarily directed to preferred embodiments of the invention. Although some attention was given to alternatives, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. A control valve assembly for a hydraulic system in which a variable displacement pump sends fluid, drawn from a tank, into a supply conduit, and wherein the hydraulic system has a plurality of hydraulic actuators, the control valve assembly comprising:

a flow summation node;

a first supply node connected by a first passageway to the flow summation node;

a second supply node;

a first element defining a second passageway between the flow summation node and the second supply node and restricting fluid flow to a greater degree than restriction of fluid flow through the first passageway;

a first control valve and a second control valve, each having a variable first path, a variable second path, and a variable third path;

wherein the variable first paths of both the first and second control valves are connected in parallel to form a variable flow section through which fluid flows between the variable displacement pump and the flow summation node, fluid selectively flows through the variable second path of the first control valve between with the first supply node and a first hydraulic actuator, fluid selectively flows through the variable second path of the second control valve between with the second supply node and a second hydraulic actuator, and the variable third paths of both the first and second control valves are connected in series to form a bypass passage through which fluid flows between the flow summation node and the tank; and a first priority check valve through which fluid flows only in a direction into the second supply node from a point in the bypass passage that is between first and second control valves.

2. The control valve assembly as recited in claim 1 wherein the first passageway directly connects the flow summation node to the first supply node.

3. The control valve assembly as recited in claim 1 wherein the first element is a first supply orifice.

4. The control valve assembly as recited in claim 1 further comprising a fixed inlet orifice providing a fluid path between an outlet of the variable displacement pump and the flow summation node.

5. The control valve assembly as recited in claim 1 further comprising a load sense conduit through which pressure at the flow summation node is communicated to a control port of the variable displacement pump.

6. The control valve assembly as recited in claim 1 wherein in each of the first and second control valves, the variable first path enlarges as the variable second path enlarges, and the variable first path shrinks as the variable second path shrinks.

7. The control valve assembly as recited in claim 1 wherein in each of the first and second control valves, the variable third path shrinks as the variable second path enlarges, and the variable third path enlarges as the variable second path shrinks.

8. The control valve assembly as recited in claim 1 wherein in each of the first and second control valves, the variable first path enlarges and shrinks as the variable second path enlarges and shrinks, respectively; and the variable third path shrinks and enlarges as the variable second path enlarges and shrinks, respectively.

9. The control valve assembly as recited in claim 1 wherein in each of the first and second control valves, the variable first path comprises a variable source orifice; the variable second path comprises a variable metering orifice; and the variable third path comprises a variable bypass orifice.

10. The control valve assembly as recited in claim 9 wherein each of the first and second control valves further comprises a first workport to which one of the plurality of hydraulic actuators is connected; and wherein each control valve has:

a) a first position in which the first workport is closed, the variable source orifice has a first size, and the variable bypass orifice has a second size, and b) a second position in which the first workport is coupled through the second path to the respective supply node, the variable source orifice has a third size that is greater than the first size, and the variable bypass orifice has a fourth size that is less than the second size.

11. The control valve assembly as recited in claim 10 wherein in each of the first and second control valves further comprises a second workport to which the one of the plurality of hydraulic actuators is connected; and each control valve has:

c) a third position in which the second workport is coupled by the metering orifice to the flow summation node, the variable source orifice has a fifth size that is greater than the first size, and the variable bypass orifice has a sixth size that is less than the second size.

12. The control valve assembly as recited in claim 1 wherein the first element comprises a first supply orifice provided in the second passageway and the second supply node.

13. The control valve assembly as recited in claim 1 wherein a first supply orifice is directly connected to the flow summation node and provides a path through which fluid flows between the flow summation node and the second supply node.

14. The control valve assembly as recited in claim 1 further comprising a third control valve that is connected to a third supply node, wherein the third supply node receives fluid from the bypass passage through a second priority check valve and receives fluid from the flow summation node through a second supply orifice.

15. The control valve assembly as recited in claim 1 wherein each of the plurality of hydraulic functions further comprises a priority check valve that prevents fluid flow in a direction through the second path into the respective supply node.

16. The control valve assembly as recited in claim 1 further comprising:

a third supply node;

a third control valve that comprises a variable first path through which fluid flows from the supply conduit to the flow summation node, a variable second path through which fluid flows from the third supply node to a third hydraulic actuator, and a variable third path connected in the bypass passage in series with the variable third path of each of the first and second control valves;

a second priority check valve through which fluid flows only in a direction into the third supply node from a point in the bypass passage that is between second and third control valves; and a second supply orifice through which fluid flows from the flow summation node to the third supply node.

17. A control valve assembly for a hydraulic system in which a variable displacement pump sends fluid, drawn from a tank, into a supply conduit, a plurality of hydraulic functions are connected to the supply conduit and to a return conduit connected to a tank, and each hydraulic function has a hydraulic actuator and a control valve that controls flow of fluid from the supply conduit to the hydraulic actuator, the control valve assembly comprising:

a flow summation node;

a first supply node connected to a first hydraulic function and connected to the flow summation node;

a second supply node connected to a second hydraulic function;

each control valve having a variable source orifice through which fluid flows from the supply conduit to the flow summation node, a variable metering orifice through which fluid flows to a respective one of the plurality of hydraulic actuators from the first or second supply node associated with the respective hydraulic function, and a variable bypass orifice, wherein the variable bypass orifices of the control valves are connected in series between the flow summation node and the return conduit thereby forming a bypass passage;

a first priority check valve through which fluid flows only in a direction into the second supply node from a point in the bypass passage that is between first and second hydraulic functions; and a first supply orifice through which fluid flows from the first supply node to the second supply node.

18. The control valve assembly as recited in claim 17 further comprising a load sense conduit through which pressure at the flow summation node is communicated to a control port of the variable displacement pump.

19. The control valve assembly as recited in claim 17 wherein in each control valve, the variable source orifice enlarges and shrinks as the variable metering orifice enlarges and shrinks, respectively; and the variable bypass orifice shrinks and enlarges as the variable metering orifice enlarges and shrinks, respectively.

20. The control valve assembly as recited in claim 17 further comprising:

a third supply node;

another one of the plurality of control valves that includes a variable source orifice through which fluid flows from the supply conduit to the flow summation node, a variable metering orifice through which fluid flows to a respective one of the plurality of hydraulic actuators from the third supply node, and a variable bypass orifice connected in series with the variable bypass orifices of the other control valves in the bypass passage;

a second priority check valve through which fluid flows only in a direction into the third supply node from a point in the bypass passage that is between second and third hydraulic functions; and a second supply orifice through which fluid flows from the second supply node to the third supply node.

21. A control valve assembly for a hydraulic system in which a variable displacement pump sends fluid drawn from a tank into a supply conduit, a plurality of hydraulic functions are connected to the supply conduit and to a return conduit connected to a tank, and each hydraulic function has a hydraulic actuator and a control valve that controls flow of fluid from the supply conduit to the hydraulic actuator, the control valve assembly comprising:

a flow summation node;

a first supply node connected to a first hydraulic function and connected to the flow summation node;

a second supply node connected to a second hydraulic function;

each control valve having a variable source orifice through which fluid flows from the supply conduit to the flow summation node, a variable metering orifice through which fluid flows to a respective one of the plurality of hydraulic actuators from the first or second supply node associated with the respective hydraulic function, and a variable bypass orifice, wherein the variable bypass orifices of the control valves are connected in series between the flow summation node and the return conduit thereby forming a bypass passage;

a first priority check valve through which fluid flows only in a direction into the second supply node from a point in the bypass passage that is between the first and second hydraulic functions; and a first supply orifice connected in a first supply path that has one end directly connected to the flow summation node and another end directly connected to the second supply node.

22. The control valve assembly as recited in claim 21 further comprising a load sense conduit through which pressure at the flow summation node is communicated to a control port of the variable displacement pump.

23. The control valve assembly as recited in claim 21 wherein in each control valve, the variable source orifice enlarges and shrinks as the variable metering orifice enlarges and shrinks, respectively; and the variable bypass orifice shrinks and enlarges as the variable metering orifice enlarges and shrinks, respectively.

24. The control valve assembly as recited in claim 21 further comprising:

a third supply node;

another one of the plurality of control valves includes a variable source orifice through which fluid flows from the supply conduit to the flow summation node, a variable metering orifice through which fluid flows to a respective one of the plurality of hydraulic actuators from the third supply node, and a variable bypass orifice connected in series with the variable bypass orifices of the other control valves in the bypass passage;

a second priority check valve through which fluid flows only in a direction into the third supply node from a point in the bypass passage that is between second and third hydraulic functions; and a second supply orifice connected in a second supply path that has one end directly connected to the flow summation node and another end directly connected to the third supply node.

* * * * *

UNITED STATES PATENT AND TRADEMARK OFFICE

CERTIFICATE OF CORRECTION

PATENT NO. : 8,899,034 B2
APPLICATION NO. : 13/334153
DATED : December 2, 2014
INVENTOR(S) : Jacob Ballweg et al.

It is certified that error appears in the above-identified patent and that said Letters Patent is hereby corrected as shown below:

In the Claims

Column 15, Claim 12, line 8-9, "passageway and the second supply node." should be --passageway.--

Signed and Sealed this
Fifth Day of May, 2015

Michelle K. Lee
*Director of the United States Patent and Trademark Office*